(12) United States Patent
Nakatsuka

(10) Patent No.: US 12,429,825 B2
(45) Date of Patent: Sep. 30, 2025

(54) EXTERIOR MEMBER AND TIMEPIECE

(71) Applicant: CASIO COMPUTER CO., LTD., Tokyo (JP)

(72) Inventor: Yoshiki Nakatsuka, Higashiyamato (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 407 days.

(21) Appl. No.: 17/939,447

(22) Filed: Sep. 7, 2022

(65) Prior Publication Data

US 2023/0069850 A1 Mar. 9, 2023

(30) Foreign Application Priority Data

Sep. 7, 2021 (JP) .................................. 2021-145327
Sep. 7, 2021 (JP) .................................. 2021-145328

(51) Int. Cl.
  *G04B 37/22* (2006.01)
  *B32B 5/02* (2006.01)
  *B32B 5/12* (2006.01)
  *G04B 37/18* (2006.01)

(52) U.S. Cl.
  CPC ................ *G04B 37/22* (2013.01); *B32B 5/02* (2013.01); *B32B 5/12* (2013.01); *G04B 37/18* (2013.01)

(58) Field of Classification Search
  None
  See application file for complete search history.

(56) References Cited

U.S. PATENT DOCUMENTS

| 9,817,370 B2 | 11/2017 | Amano |
| 11,077,638 B2 * | 8/2021 | Hatano ..................... B32B 3/04 |
| 2016/0274541 A1 | 9/2016 | Amano |
| 2021/0141342 A1 | 5/2021 | Amano |

FOREIGN PATENT DOCUMENTS

| JP | 2005114495 A | 4/2005 |
| JP | 2013140922 A | 7/2013 |
| JP | 2014030522 A | 2/2014 |
| JP | 2016173277 A | 9/2016 |
| JP | 2018116009 A | 7/2018 |
| JP | 6598270 B2 | 10/2019 |
| JP | 2021076442 A | 5/2021 |
| WO | 2018066156 A1 | 4/2018 |

OTHER PUBLICATIONS

Notice of Reasons for Refusal dated May 19, 2023 received in Japanese Patent Application No. JP 2021-145327.
Notice of Reasons for Refusal dated May 27, 2025 received in Japanese Patent Application No. 2021-145328.

* cited by examiner

*Primary Examiner* — Jennifer A Boyd
(74) *Attorney, Agent, or Firm* — SCULLY SCOTT MURPHY & PRESSER, PC

(57) ABSTRACT

An exterior member including an exterior main body having laminated first fiber resin sheets, and a protection member provided on an end surface constituted by layers of the first fiber resin sheets of the exterior main body.

10 Claims, 8 Drawing Sheets

EXTERIOR MEMBER AND TIMEPIECE

CROSS-REFERENCE TO RELATED APPLICATIONS

This application is based upon and claims the benefit of priority from the prior Japanese Patent Applications No. 2021-145327, filed Sep. 7, 2021, and No. 2021-145328, filed Sep. 7, 2021, the entire contents of which are incorporated herein by reference.

BACKGROUND OF THE INVENTION

1. Field of the Invention

The present invention relates to an exterior member which is used for electronic devices such as wristwatches and portable information terminals, and a timepiece having the exterior member.

2. Description of the Related Art

For example, an exterior member for wristwatches is known which has a structure where carbon fibers serving as reinforcing materials have been laminated in front and back directions so as to form a carbon fiber-reinforced resin sheet, and thermosetting resin has been provided on the front and back sides of the carbon fiber-reinforced resin sheet, as described in Japanese Patent Application Laid-Open (Kokai) Publication No. 2005-114495.

By this structure of the exterior member for wristwatches in which thermosetting resin has been provided on the front and back sides of the carbon fiber-reinforced resin sheet acquired by carbon fibers being laminated in front and back directions, weight saving can be achieved. However, this structure has a problem in that sufficient strength cannot be acquired and therefore sufficient impact resistance cannot be achieved.

SUMMARY OF THE INVENTION

An embodiment of the present invention is an exterior member comprising: an exterior main body having laminated first fiber resin sheets; and a protection member provided on an end surface constituted by layers of the first fiber resin sheets of the exterior main body.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

DETAILED DESCRIPTION OF THE PREFERRED EMBODIMENT

An embodiment where the present invention has been applied in a wristwatch will hereinafter be described with reference to FIG. 1 to FIG. 8.

Figure 1:
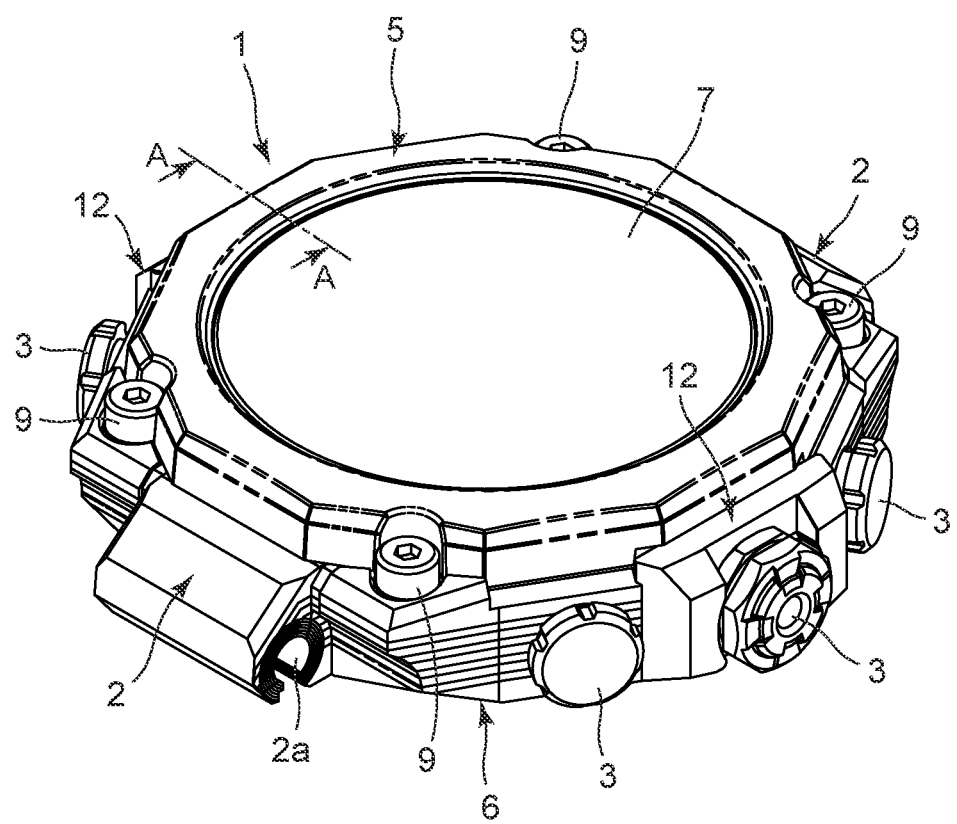
FIG. 1 is an enlarged perspective view showing an embodiment where the present invention has been applied in a wristwatch.

This wristwatch includes a wristwatch case 1, as shown in FIG. 1. On the twelve o'clock side and six o'clock side of the wristwatch case 1, band attachment sections 2 to which watch bands (not shown) are attached are provided projecting outward. Also, on five portions of the wristwatch case 1 on the two o'clock side, the three o'clock side, the four o'clock side, the eight o'clock side, and the ten o'clock side, switch sections 3 are provided.

Figure 2:
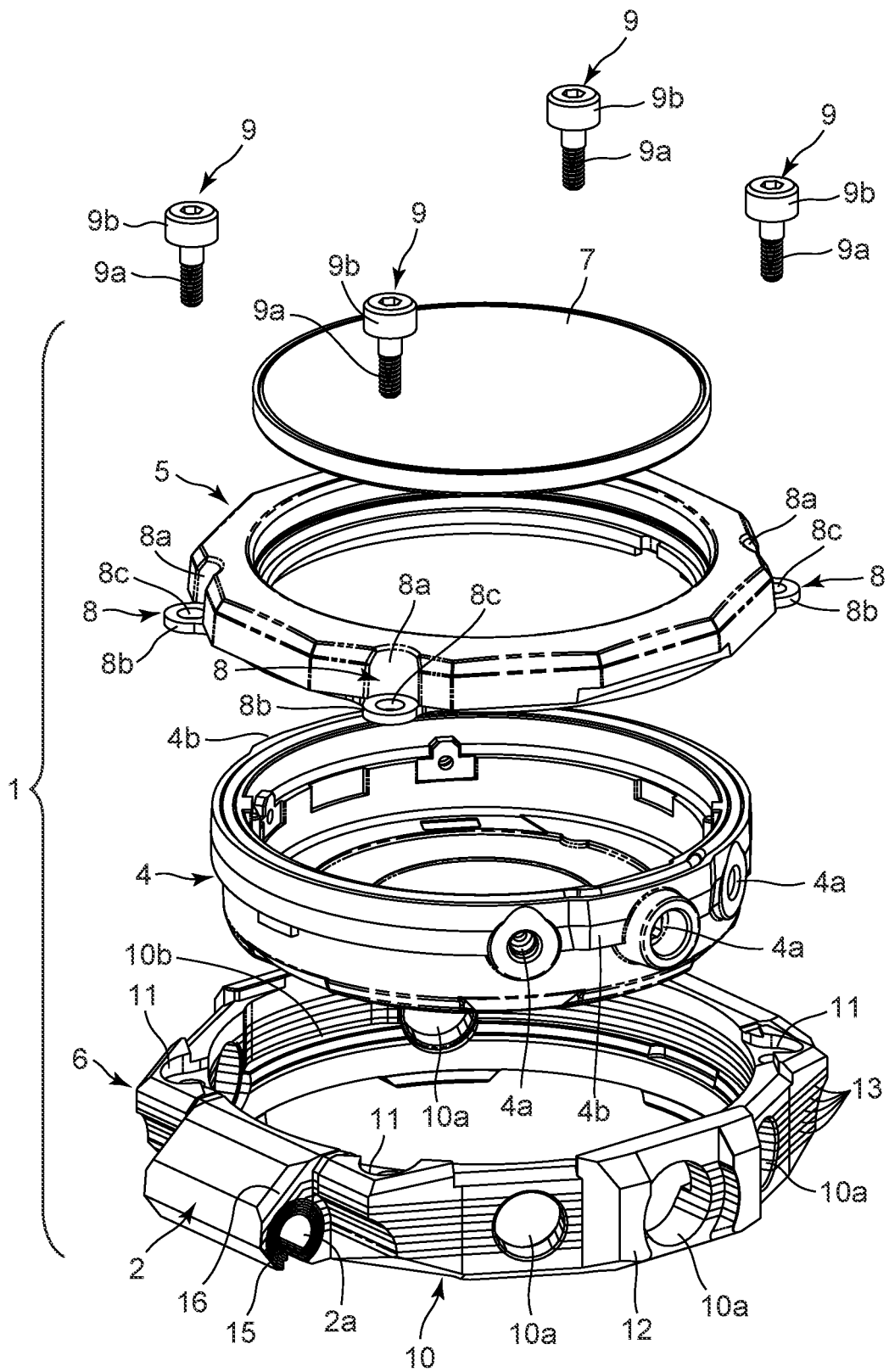
FIG. 2 is an enlarged perspective view showing a disassembled state of a wristwatch case shown in FIG. 1.

This wristwatch case 1 includes a lower case 4, an upper case 5, and an exterior member 6, as shown in FIG. 1 and FIG. 2. The lower case 4, in which a timepiece module (not shown in the drawings) is arranged, is made of a metal such as stainless steel or a hard synthetic resin, and has a cylindrical shape with a bottom portion. In outer circumferential portions of this lower case 4 on the two o'clock side, the three o'clock side, the four o'clock side, the eight o'clock side, and the ten o'clock side, switch attachment holes 4a are formed to which the switch sections 3 are attached.

The upper case 5, to the inner circumferential surface of which a watch glass 7 is attached via a glass packing 7a (refer to FIG. 6), is made of a metal such as stainless steel or a hard synthetic resin, and has a substantially ring shape, as shown in FIG. 1 and FIG. 2. This upper case 5 is structured to be arranged on the upper part of the lower case 4 with a waterproof ring 5a (refer to FIG. 6) being arranged between its undersurface and the upper surface of the lower case 4.

On outer surface portions of the upper case 5 on the one o'clock side, the five o'clock side, the seven o'clock side, and the eleven o'clock side, screw attachment sections 8 are provided, as shown in FIG. 1 and FIG. 2. Each of these screw attachment sections 8 is structured to include a groove section 8a having a semicircular arc shape and formed in the outer surface of the upper case 5 in a vertical direction, and a circular section 8b which semicircularly projects outward from inside the groove section 8a and in the center of which a screw insertion hole 8c is formed.

As a result, the upper case 5 is structured such that, when thread sections 9a of screw members 9 are inserted into the screw insertion holes 8c of the screw attachment sections 8 and screwed into screw holes 11a of the exterior member 6 described later, this upper case 5 is pressed against the exterior member 6 by screw head sections 9b, and thereby attached to the upper part of the exterior member 6 while covering the upper part of the lower case 4, as shown in FIG. 1 and FIG. 2.

The exterior member 6, into which the lower case 4 is inserted from above and arranged, has an exterior main body 10 which has a substantially ring shape and is arranged around the outer circumference of the lower case 4, as shown in FIG. 1 and FIG. 2. In side wall portions of the exterior main body 10 on the two o'clock side, the three o'clock side, the four o'clock side, the eight o'clock side, and the ten o'clock side, switch insertion holes 10a in which the switch head portions of the switch sections 3 are arranged are formed corresponding to the plurality of switch attachment holes 4a formed in the lower case 4.

Figure 6:
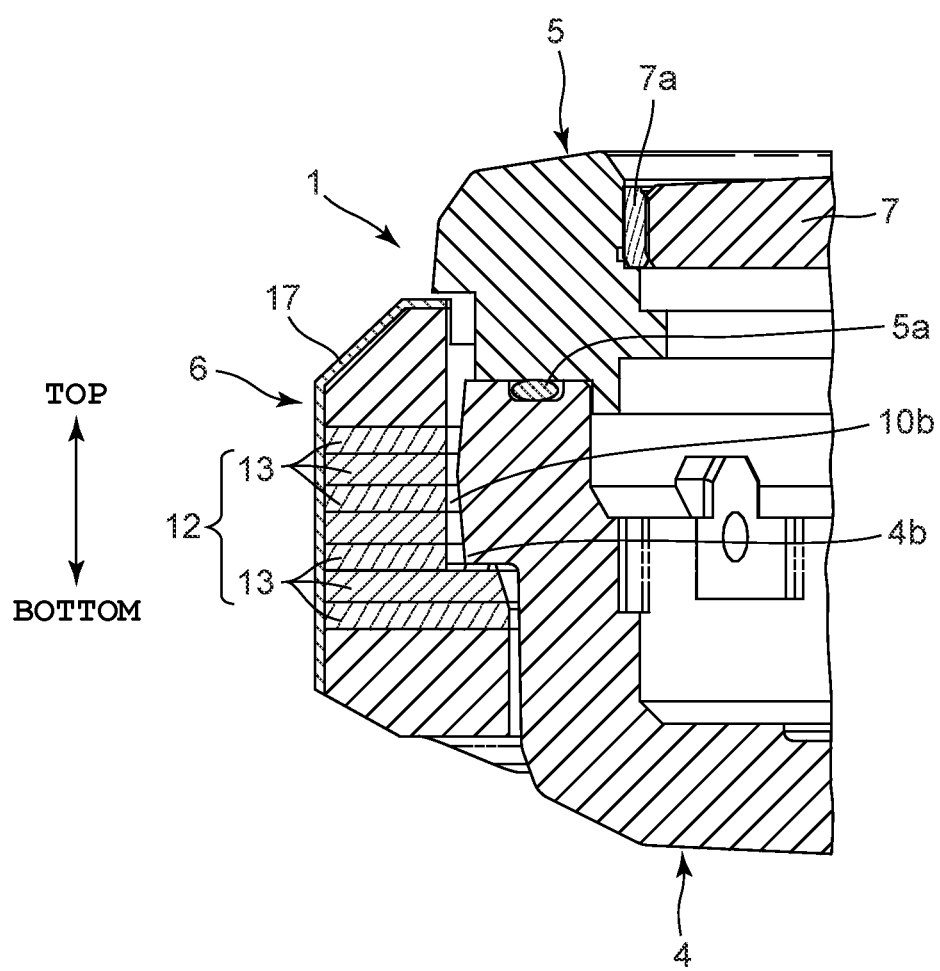
FIG. 6 is an enlarged cross-sectional view showing a projection section on the nine o'clock side of the wristwatch case taken along the A-A arrow view in FIG. 1.

Also, on inner portions of the exterior main body 10 on the three o'clock side and the nine o'clock side, stopper recess sections 10b are formed in the inner circumferential surface in a manner to be open toward the upper end surface, as shown in FIG. 2 to FIG. 4 and FIG. 6. These stopper recess sections 10b are structured such that, when engaging projections 4b formed on portions of the outer circumferential surface of the lower case 4 on the three o'clock side and the nine o'clock side are inserted from above, the lower ends of these engaging projections 4b of the lower case 4 come in contact with and engage with the inner bottom ends of the stopper recess sections 10b so that the lower case 4 is not downwardly slipped out from the exterior member 6, as shown in FIG. 6.

Figure 3:
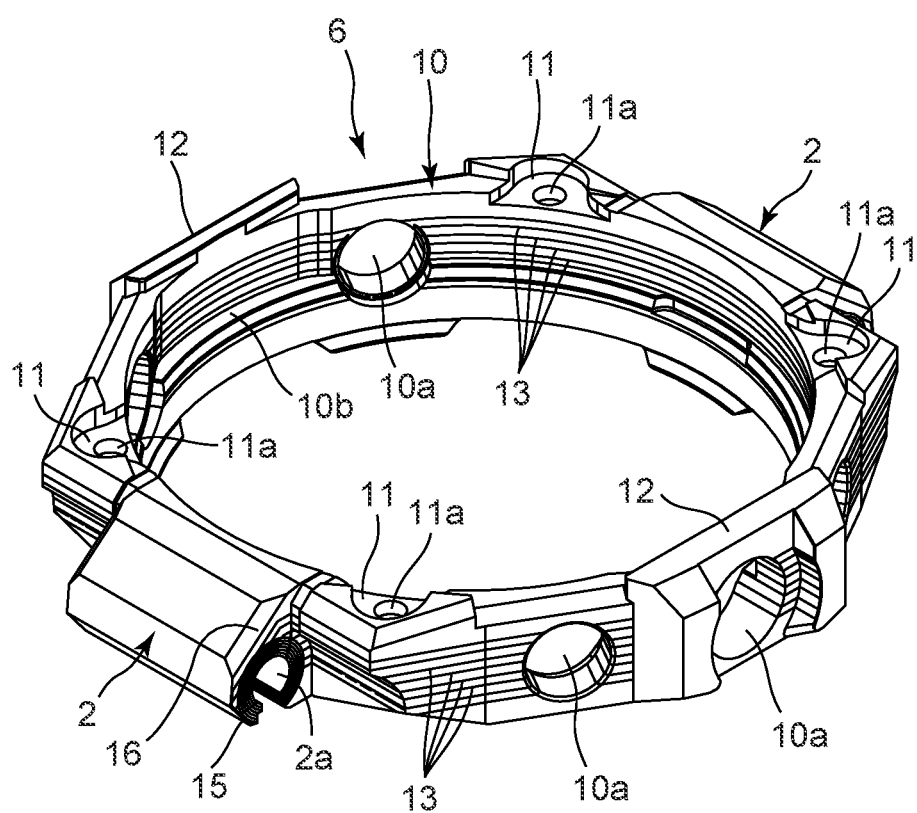
FIG. 3 is an enlarged perspective view showing an exterior member for the wristwatch case shown in FIG. 2.

Moreover, in portions of the upper surface of the exterior main body 10 on the one o'clock side, the five o'clock side, the seven o'clock side, and the eleven o'clock side, attachment recess sections 11 are formed in which the circular sections 8b of the screw attachment sections 8 of the upper case 5 are arranged, as shown in FIG. 1 to FIG. 3. In these attachment recess sections 11, the screw holes 11a are formed into which the thread sections 9a of the screw members 9 are screwed. As a result, the upper case 5 is structured such that, when the lower case 4 is arranged in the exterior main body 10 of the exterior member 6, and this upper case 5 is arranged on the exterior member 6 while covering the upper part of the lower case 4, the circular sections 8b of the screw attachment sections 8 of the upper case 5 are arranged in the attachment recess sections 11 of the exterior member 6.

That is, the exterior member 6 is structured such that the thread sections 9a of the screw members 9 are screwed into the screw holes 11a of the attachment recess sections 11 through the screw insertion holes 8c in the circular sections 8b of the screw attachment sections 8 of the upper case 5 with the screw insertion holes 8c in the circular sections 8b being positioned coaxially with the screw holes 11a in the attachment recess sections 11 of the exterior main body 10, whereby the upper case 5 is pressed against the exterior main body 10 by the screw head sections 9b, as shown in FIG. 1 to FIG. 3.

The screw members 9 are structured such that, when the thread sections 9a are screwed into the screw holes 11a through the screw insertion holes 8c and tightened, the screw head sections 9b press the circular sections 8b of the screw attachment sections 8 of the upper case 5 against the attachment recess sections 11 of the exterior member 6, as shown in FIG. 1 to FIG. 3. As a result, the lower case 4 is structured to be held down by the upper case 5 and fixed in the exterior member 6 with the lower ends of the engaging projections 4b being in contact with and engaging with the inner bottom ends of the stopper recess sections 10b of the exterior main body 10, as shown in FIG. 6.

Also, on portions of the outer circumferential surface of the exterior main body 10 on the three o'clock side and the nine o'clock side, projection sections 12 are provided projecting sideward, as shown in FIG. 1 and FIG. 2. The projection section 12 on the three o'clock side, which protects the switch head portion of the corresponding switch section 3, is provided between the two o'clock side and the four o'clock side. In the center of this projection section 12 on the three o'clock side, a switch insertion hole 10a is formed in which the switch head portion of the corresponding switch section 3 is arranged. The projection section 12 on the nine o'clock side is provided between the eight o'clock side and the ten o'clock side.

Moreover, on portions of the exterior main body 10 on the twelve o'clock side and the six o'clock side, the band attachment sections 2 which are attachment projection sections are provided projecting outward, as shown in FIG. 2 to FIG. 5. Each of these band attachment sections 2, to which a watch band (not shown in the drawings) is attached, has formed therein a band attachment hole 2a which extends along the outer circumference of the exterior main body 10. That is, although not shown in the drawings, these band attachment sections 2 are structured such that the watch bands are attached thereto by connection members such as spring rods provided on the ends of the watch bands being inserted into the band attachment holes 2a.

Figure 4:
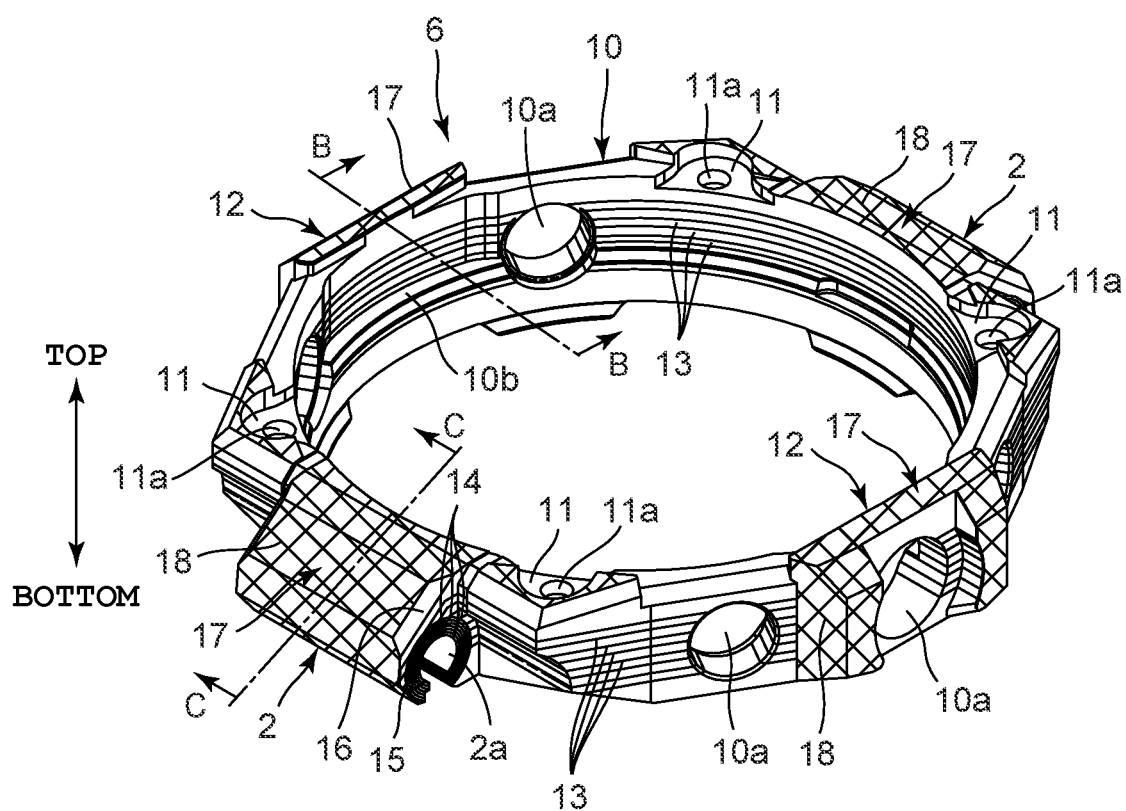
FIG. 4 is an enlarged perspective view showing the extending directions of the fibers of third fiber-reinforced resin sheets provided on the surfaces of projection sections of the exterior member and the surfaces of band attachment sections shown in FIG. 3.
Figure 5:
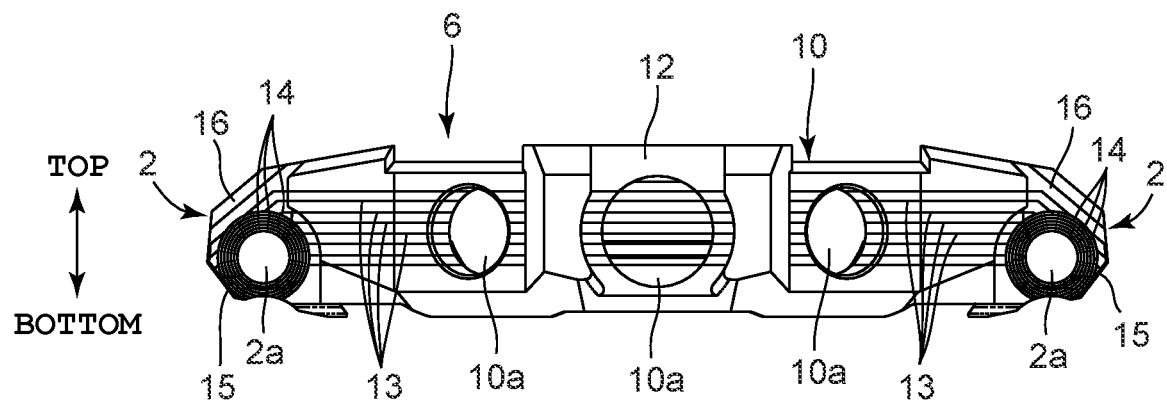
FIG. 5 is an enlarged side view showing the three o'clock side of the exterior member of FIG. 3.

The exterior main body 10 excluding the band attachment sections 2 has a structure where first fiber-reinforced resin sheets 13, which are first fiber resin sheets, have been vertically and sequentially laminated, as shown in FIG. 4 and FIG. 5. Each of these first fiber-reinforced resin sheets 13 is a sheet acquired by arrayed carbon fibers or glass fibers being solidified by synthetic resin.

Note that, as the above-described structure related to the first fiber-reinforced resin sheets 13 shown in FIG. 4 and FIG. 5, a structure may be adopted in which only sheets having arrayed carbon fibers have been laminated. In addition, a structure may be adopted in which only sheets having arrayed glass fibers have been laminated, and these sheets have been colored for each layer. Moreover, a structure may be adopted in which sheets having arrayed carbon fibers and sheets having arrayed glass fibers have been mixedly laminated. Although the first fiber-reinforced resin sheets 13 having arrayed carbon fibers are black in color, the first fiber-reinforced resin sheets 13 having arrayed glass fibers can be colored.

When being vertically laminated, the first fiber-reinforced resin sheets 13 should preferably be laminated such that the array directions of the fibers cross one another so as to ensure the strength of the exterior main body 10, as shown in FIG. 4 and FIG. 5. As the synthetic resin which solidifies fibers for the first fiber-reinforced resin sheets 13, polycarbonate resin, ABS (Acrylonitrile Butadiene Styrene) resin, epoxy resin, polyether resin, and the like may be used.

As a result, the exterior main body 10 is formed in a substantially ring shape having high strength as a whole by the first fiber-reinforced resin sheets 13 being vertically laminated and the synthetic resins of the sheets being adhered to one another by thermo-compression bonding, as shown in FIG. 4 and FIG. 5. The outer circumferential surface and the inner circumferential surface of the exterior main body 10 formed in the substantially ring shape is subjected to cutting machining so that the exterior main body 10 has a desired shape.

Figure 7:
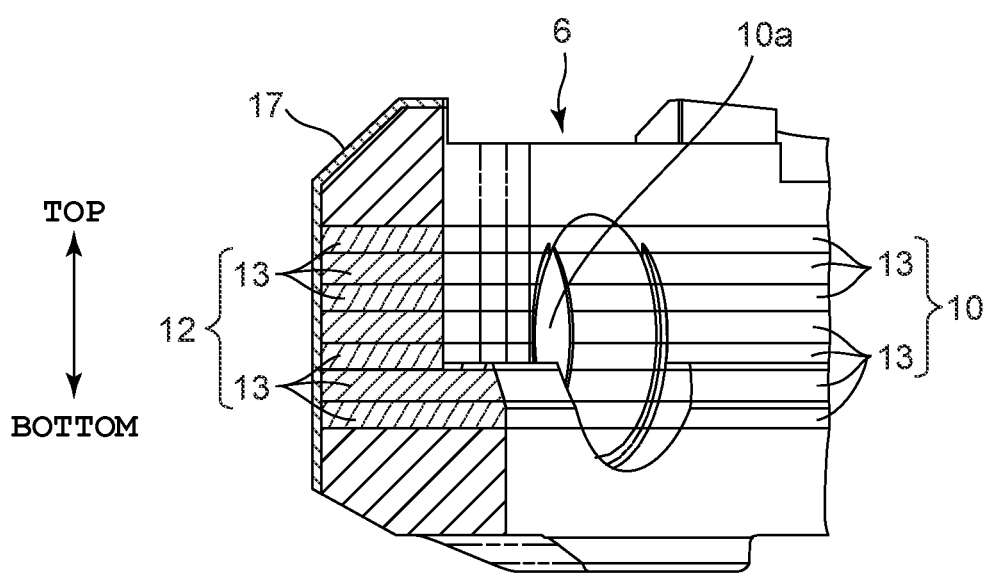
FIG. 7 is an enlarged cross-sectional view showing the projection section on the nine o'clock side of the exterior member taken along the B-B arrow view in FIG. 4.

As in the case of the exterior main body 10, the projection sections 12 of the exterior main body 10 on the three o'clock side and the nine o'clock side have a structure where the first fiber-reinforced resin sheets 13 have been vertically and sequentially laminated, as shown in FIG. 6 and FIG. 7. Also, the band attachment sections 2 of the exterior main body 10 on the twelve o'clock side and the six o'clock side have reinforcement sections 15 acquired by second fiber-reinforced resin sheets 14 being cylindrically rolled, as shown in FIG. 3 to FIG. 5 and FIG. 8.

More specifically, the reinforcement section 15 of each band attachment section 2 is formed in a cylindrical shape where the second fiber-reinforced resin sheets 14 have been concentrically rolled centering on the corresponding band attachment hole 2a provided in a direction along the outer circumference of the band attachment section 2, and laminated as a multilayer, as shown in FIG. 3 to FIG. 5 and FIG. 8. The second fiber-reinforced resin sheets 14 may be glass fiber-reinforced resin sheets formed of arrayed glass fibers. However, they should preferably be carbon fiber-reinforced resin sheets formed of arrayed carbon fibers.

Each second fiber-reinforced resin sheet 14 is formed such that the extending direction of its carbon fibers when it is cylindrically rolled is a direction intersecting with an axial direction of the corresponding band attachment hole 2a which is a cylinder axial direction, or a direction perpendicular to this axial direction, as shown in FIG. 3 to FIG. 5 and FIG. 8. That is, each second fiber-reinforced resin sheet 14 is formed such that its fibers are arrayed in a manner to be subject to force in a tensile direction when the watch band (not shown) attached to the corresponding band attachment section 2 is pulled in a longitudinal direction.

Also, when concentrically rolled, the second fiber-reinforced resin sheets 14 are laminated and rolled in a cylindrical shape such that the array directions of their fibers cross one another, as shown in FIG. 3 to FIG. 5 and FIG. 8. Moreover, the second fiber-reinforced resin sheets 14 are formed to be laminated in a direction perpendicular to the axial direction of the corresponding band attachment hole 2a which is a cylinder axial direction, and rolled in a cylindrical shape.

Figure 8:
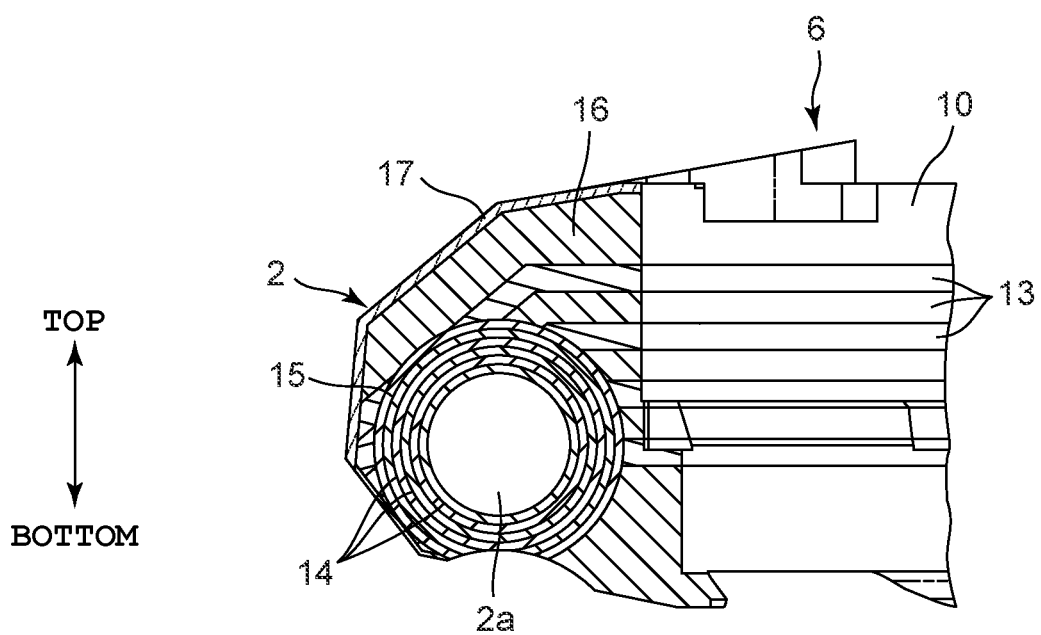
FIG. 8 is an enlarged cross-sectional view showing a band attachment section on the six o'clock side of the exterior member taken along the C-C arrow view in FIG. 4.

Also, each band attachment section 2 includes a shaping section 16 which shapes the entire form of the corresponding band attachment section 2 when the corresponding reinforcement section 15 is attached to the exterior main body 10, as shown in FIG. 4, FIG. 5, and FIG. 8. This shaping section 16 is provided corresponding to the outer and upper surface sides of the cylindrical reinforcement section 15. More specifically, a part of the shaping section 16 corresponding to the outer side of the reinforcement section 15 has a structure where the first fiber-reinforced resin sheets 13 have been vertically laminated, as with the exterior main body 10.

Also, in the case of a part of the shaping section 16 corresponding to the upper surface side of the reinforcement section 15, a portion from the exterior main body 10 side to the center of the upper surface has a structure where the first fiber-reinforced resin sheets 13 of the exterior main body 10 have been vertically laminated, and a portion from the center of the upper surface to the outer side has a structure where the first fiber-reinforced resin sheets 13 of the exterior main body 10 have been laminated while being inclined in a tangential direction with respect to the outer circumference of the cylindrical shape of the reinforcement section 15, as shown in FIG. 4, FIG. 5, and FIG. 8. As such, the band attachment sections 2 are constituted by the reinforcement sections 15 and the shaping sections 16.

In the present embodiment, the reinforcement sections 15 and shaping sections 16 of the band attachment sections 2 are adhered to portions of the side surface of the exterior main body 10 on the twelve o'clock side and the six o'clock side by welding, as shown in FIG. 4, FIG. 5, and FIG. 8. That is, the first fiber-reinforced resin sheets 13 of the exterior main body 10 and those of the shaping sections 16 are sheets acquired by arrayed fibers being solidified by synthetic resin, and the second fiber-reinforced resin sheets 14 of the reinforcement sections 15 are sheets acquired by arrayed carbon fibers being solidified by synthetic resin.

Accordingly, the reinforcement section 15 and shaping section 16 of each band attachment section 2 are structured to be firmly adhered to each other by the synthetic resins of the first fiber-reinforced resin sheets 13 and those of the second fiber-reinforced resin sheets 14 being heated and melted and the first fiber-reinforced resin sheets 13 and the second fiber-reinforced resin sheets 14 in this state being welded to one another by thermo-compression bonding, as shown in FIG. 4, FIG. 5, and FIG. 8.

On the surfaces, or more specifically, the outer surfaces of the projection sections 12 provided projecting on outer circumferential portions of the exterior member 6 on the three o'clock side and the nine o'clock side, and the surfaces, or more specifically, the outer surfaces of the band attachment sections 2 on the twelve o'clock side and the six o'clock side, protective layers 17 which are protection members are provided, as shown in FIG. 4 and FIG. 6 to FIG. 8. These protective layers 17, which protect an end surface constituted by the layers of the first fiber-reinforced resin sheets 13 of the exterior main body 10, are formed of third fiber-reinforced resin sheets 18 serving as second fiber resin sheets in which fibers have been arrayed in a direction intersecting with the laminating direction of the first fiber-reinforced resin sheets 13.

Each third fiber-reinforced resin sheet 18 may be a glass fiber-reinforced resin sheet acquired by arrayed glass fibers being solidified by synthetic resin. However, it should preferably be a carbon fiber-reinforced resin sheet acquired by arrayed carbon fibers being solidified by synthetic resin, as shown in FIG. 4. Also, each third fiber-reinforced resin sheet 18 may be a sheet in which carbon fibers have been arrayed in one direction intersecting with the laminating direction of the first fiber-reinforced resin sheets 13 of the exterior main body 10. However, it should preferably be a mesh sheet in which carbon fibers have been arrayed in two directions intersecting with the laminating direction of the first fiber-reinforced resin sheets 13 of the exterior main body 10 such that these carbon fibers cross one another.

In each third fiber-reinforced resin sheet 18 of the present embodiment formed in a mesh pattern, since carbon fibers have been arrayed in two directions intersecting with the laminating direction of the first fiber-reinforced resin sheets 13 of the exterior main body 10 such that these carbon fibers cross one another, its rigidity and strength are higher than those of a sheet in which carbon fibers have been arrayed in one direction intersecting with the laminating direction of the first fiber-reinforced resin sheets 13 of the exterior main body 10, as shown in FIG. 4. These third fiber-reinforced resin sheets 18 are firmly adhered to the surfaces of the projection sections 12 and the surfaces of the band attachment sections 2 by welding, as shown in FIG. 6 to FIG. 8.

That is, each third fiber-reinforced resin sheet 18 is a sheet in which carbon fibers have been arrayed in two directions intersecting with the laminating direction of the first fiber-reinforced resin sheets 13 of the exterior main body 10 such that these carbon fibers cross one another, as shown in FIG. 6 to FIG. 8. Accordingly, the third fiber-reinforced resin sheets 18 are structured to be firmly adhered to the first fiber-reinforced resin sheets 13 of the exterior main body 10 by the synthetic resins of the third fiber-reinforced resin sheets 18 and the synthetic resins of the first fiber-reinforced resin sheets 13 of the exterior main body 10 being heated and melted and the third fiber-reinforced resin sheets 18 and the first fiber-reinforced resin sheets 13 in this state being welded to one another by thermo-compression bonding.

The surface of the exterior main body 10 where the first fiber-reinforced resin sheets 13 have been laminated is an end surface constituted by the layers of the first fiber-reinforced resin sheets 13, as shown in FIG. 6 to FIG. 8. Thus, the third fiber-reinforced resin sheets 18 of the protective layers 17 are structured to prevent the first fiber-reinforced resin sheets 13 from being peeled or damaged when the end surface constituted by the layers of the first fiber-reinforced resin sheets 13 of the exterior main body 10 is subjected to an impact.

Next, a procedure for assembling this wristwatch case 1 is described.

Before this assembly, the exterior member 6 is manufactured in advance. More specifically, the first fiber-reinforced resin sheets 13 are vertically and sequentially laminated so as to form the exterior main body 10 having a substantially ring shape. In this lamination, the first fiber-reinforced resin sheets 13 are laminated such that the extending directions of the fibers of the first fiber-reinforced resin sheets 13 differ and cross one another, and then the synthetic resins of the laminated first fiber-reinforced resin sheets 13 are heated and firmly adhered to one another.

As a result, the first fiber-reinforced resin sheets 13 are sequentially laminated, whereby the exterior main body 10 having a substantially ring shape is formed. Here, the projection sections 12 are formed projecting on the portions of the exterior main body 10 on the three o'clock side and the nine o'clock side. More specifically, as with the exterior main body 10, the projection sections 12 are formed by the first fiber-reinforced resin sheets 13 being sequentially laminated, as shown in FIG. 7.

In this state, the band attachment sections 2 are provided on the portions of the exterior main body 10 on the twelve o'clock side and the six o'clock side. Here, before the band attachment sections 2 are provided thereon, the reinforcement sections 15 of the band attachment sections 2 are formed. More specifically, the second fiber-reinforced resin sheets 14, which are carbon fiber-reinforced resin sheets, are concentrically rolled centering on the band attachment hole 2a of each band attachment section 2 so as to form a cylindrical shape. As a result, the cylindrical reinforcement sections 15 are formed in which the band attachment holes 2a have been formed penetrating in the cylinder axial direction.

Here, the extending direction of the carbon fibers of each second fiber-reinforced resin sheet 14 when it is cylindrically rolled is a direction intersecting with the axial direction of the corresponding band attachment hole 2a or a direction perpendicular to this axial direction. That is, each second fiber-reinforced resin sheet 14 is formed such that its fibers are arrayed in a manner to be subject to force in a tensile direction when the watch band (not shown) attached to the corresponding band attachment section 2 is pulled in a longitudinal direction. As a result, the reinforcement sections 15 with high strength are formed by the second fiber-reinforced resin sheets 14.

Then, the band attachment sections 2 are formed using the reinforcement sections 15 and the shaping sections 16. Here, each shaping section 16 is constituted by a part where the first fiber-reinforced resin sheets 13 have been vertically laminated and a part where the first fiber-reinforced resin sheets 13 have been obliquely laminated. Accordingly, the band attachment sections 2 including the cylindrical reinforcement sections 15 concentrically formed by the second fiber-reinforced resin sheets 14 and the shaping sections 16 are firmly adhered to the portions of the side surface of the exterior main body 10 on the twelve o'clock side and the six o'clock side.

Here, the first fiber-reinforced resin sheets 13 of the exterior main body 10 and the shaping sections 16 and the second fiber-reinforced resin sheets 14 of the reinforcement sections 15 are sheets acquired by fibers being solidified by synthetic resin. Accordingly, the reinforcement sections 15 and shaping sections 16 of the band attachment sections 2 are arranged on the portions of the side surface of the exterior main body 10 on the twelve o'clock side and the six o'clock side, the synthetic resins of the laminated fiber-reinforced resin sheets thereof are heated and melted, and the reinforcement sections 15 and the shaping sections 16 in this state are welded and firmly adhered to one another by thermo-compression bonding.

As a result, the reinforcement sections 15 and shaping sections 16 of the band attachment sections 2 are firmly adhered to the side surface of the exterior main body 10. Note that, in place of this procedure, a procedure may be adopted in which the shaping sections 16 of the band attachment sections 2 are formed in advance on the side surface of the exterior main body 10, and the reinforcement sections 15 of the band attachment sections 2 are welded and firmly adhered to the shaping sections 16 by thermo-compression bonding.

Next, the protective layers 17 are provided on the surfaces of the projection sections 12 and the band attachment sections 2 provided projecting on the outer circumferential surface of the exterior main body 10. Note that the protective layers 17 are only required to be provided on the surfaces of the projection sections 12 and the band attachment sections 2 provided projecting on the outer circumferential surface of the exterior main body 10 although they may be provided on the entire outer circumferential surface of the exterior main body 10.

These protective layers 17 are constituted by the third fiber-reinforced resin sheets 18 each of which is acquired by fibers being arrayed in two directions intersecting with the laminating direction of the first fiber-reinforced resin sheets 13 forming the exterior main body 10. In the present embodiment, each third fiber-reinforced resin sheet 18 is a carbon fiber-reinforced resin sheet acquired by carbon fibers being solidified by synthetic resin, in which carbon fibers have been arrayed in two directions intersecting with the laminating direction of the first fiber-reinforced resin sheets 13 of the exterior main body 10 such that these carbon fibers cross one another in a mesh pattern.

That is, in each third fiber-reinforced resin sheet 18 formed in a mesh pattern, since carbon fibers have been arrayed in two directions intersecting with the laminating direction of the first fiber-reinforced resin sheets 13 of the exterior main body 10 such that these carbon fibers cross one another, its rigidity and strength are higher than those of a sheet in which carbon fibers have been arrayed in one direction intersecting with the laminating direction of the first fiber-reinforced resin sheets 13 of the exterior main body 10. Then, the protective layers 17 formed by the third fiber-reinforced resin sheets 18 are firmly adhered to at least the surfaces of the projection sections 12 and the band attachment sections 2 by welding. Note that these third fiber-reinforced resin sheets 18 may be firmly adhered to the entire outer circumferential surface of the exterior main body 10 by welding.

As a result, the third fiber-reinforced resin sheets 18 forming the protective layers 17 are provided on the end surface constituted by the layers of the first fiber-reinforced resin sheets 13 which are the surface of the exterior main body 10 where the first fiber-reinforced resin sheets 13 have been laminated. Accordingly, when the end surface constituted by the layers of the first fiber-reinforced resin sheets 13 of the exterior main body 10 is subjected to an impact, the third fiber-reinforced resin sheets 18 forming the protective layers 17 prevent the first fiber-reinforced resin sheets 13 from being peeled or damaged, so that the end surface constituted by the layers of the first fiber-reinforced resin sheets 13 of the exterior main body 10 is protected.

The inner circumferential surface and outer circumferential surface of the exterior main body 10 formed as described above is subjected to cutting machining so that the exterior main body 10 is shaped. That is, by the exterior main body 10 being subjected to cutting machining except for its portions where the projection sections 12 and the band attachment sections 2 are provided, the stopper recess sections 10b are formed on the three o'clock side and nine o'clock side of its inner circumferential surface, and the attachment recess sections 11 are formed on the one o'clock side, five o'clock side, seven o'clock side, and eleven o'clock side of its upper surface.

As such, the outer circumferential surface of the exterior main body 10 excluding its portions where the projection sections 12 and the band attachment sections 2 are provided is subjected to cutting machining, whereby the end surface constituted by the layers of the first fiber-reinforced resin sheets 13 appears on the outer circumferential surface of the exterior main body 10. As a result, on the outer circumferential surface of the exterior main body 10, the layers of the laminated first fiber-reinforced resin sheets 13 show a horizontal striped pattern, which enhances the design and commodity value of the wristwatch.

Also, in the manufacture of the exterior member 6, the switch insertion holes 10a are formed in the portions of the exterior main body 10 on the two o'clock side, the three o'clock side, the four o'clock side, the eight o'clock side, and the ten o'clock side by drilling. In addition, in the attachment recess sections 11 on the one o'clock side, five o'clock side, seven o'clock side, and eleven o'clock side of the upper surface of the exterior main body 10, the screw holes 11a are formed. As a result, the exterior member 6 is precisely and favorably formed.

Then, in the assembly of the wristwatch case 1 using this exterior member 6, the lower case 4 is inserted from above into the exterior member 6. In this insertion, the engaging projections 4b formed on the outer circumferential portions of the lower case 4 on the three o'clock side and the nine o'clock side are inserted from above into and engage with the stopper recess sections 10b formed in the inner circumferential portions of the exterior member 6 on the three o'clock side and the nine o'clock side.

Here, the plurality of switch attachment holes 4a formed on the two o'clock side, three o'clock side, four o'clock side, eight o'clock side, and ten o'clock side of the lower case 4 are arranged corresponding to the plurality of switch insertion holes 10a formed on the two o'clock side, three o'clock side, four o'clock side, eight o'clock side, and ten o'clock side of the exterior member 6. In this state, the plurality of switch sections 3 is inserted from outside the exterior member 6 into the switch attachment holes 4a of the lower case 4 through the switch insertion holes 10a of the exterior member 6 so as to be attached.

Next, the timepiece module (not shown in the drawings) is arranged in the lower case 4. In this state, the upper case 5 is arranged on and attached to the upper parts of the lower case 4 and the exterior member 6. Here, the watch glass 7 and the glass packing 7a are fitted into and attached to the upper case 5 in advance. Then, the waterproof ring 5a is arranged between the undersurface of the upper case 5 and the upper surface of the lower case 4 and, in this state, the upper case 5 is arranged on the upper parts of the lower case 4 and the exterior member 6.

Here, the plurality of screw attachment sections 8 provided on the portions of the side surface of the upper case 5 on the one o'clock side, the five o'clock side, the seven o'clock side, and the eleven o'clock side is positioned corresponding to the plurality of attachment recess sections 11 formed in the portions of the upper surface of the exterior member 6 on the one o'clock side, the five o'clock side, the seven o'clock side, and the eleven o'clock side. Then, the circular sections 8b of the plurality of screw attachment sections 8 are arranged in the plurality of attachment recess sections 11 such that the screw insertion holes 8c of the circular sections 8b correspond to the screw holes 11a of the attachment recess sections 11.

In this state, the thread sections 9a of the plurality of screw members 9 are inserted into the screw insertion holes 8c of the circular sections 8b along the groove sections 8a of the screw attachment sections 8 of the upper case 5, and screwed into the screw holes 11a of the attachment recess sections 11. Then, the screw members 9 are tightened so that the screw head sections 9b are arranged on the circular sections 8b of the screw attachment sections 8. As a result, the screw head sections 9b press the upper case 5 against the exterior member 6, and the exterior member 6 is pulled up toward the upper case 5.

Here, since the engaging projections 4b of the lower case 4 have engaged with the stopper recess sections 10b of the exterior member 6, the lower case 4 is simultaneously pulled up when the exterior member 6 is pulled up toward the upper case 5. Accordingly, the upper end surface of the lower case 4 is pressed against the lower end surface of the upper case 5 via the waterproof ring 5a. By the above-described procedure, the assembly of the wristwatch case 1 is completed, and the assembly of the wristwatch is also completed simultaneously.

As described above, the exterior member 6 of this wristwatch case 1 includes the exterior main body 10 formed by the first fiber-reinforced resin sheets 13 being laminated, and the protective layers 17 which are protection members provided on the end surface constituted by the layers of the first fiber-reinforced resin sheets 13 of the exterior main body 10, whereby the strength and the impact resistance are enhanced. That is, in this exterior member 6, since the protective layers 17 are provided on the end surface constituted by the layers of the first fiber-reinforced resin sheets 13, the strength and the impact resistance are enhanced by these protective layers 17.

Also, in the case of the exterior member 6 of this wristwatch case 1, the protective layers 17 are formed of the third fiber-reinforced resin sheets 18 in which fibers have been arrayed in a direction intersecting with the laminating direction of the first fiber-reinforced resin sheets 13, whereby the outer circumferential surface of the exterior main body 10 can be easily and favorably protected.

That is, in the exterior member 6 of this wristwatch case 1, since the third fiber-reinforced resin sheets 18 in which fibers have been arrayed in a direction intersecting with the laminating direction of the first fiber-reinforced resin sheets 13 of the exterior main body 10 are provided on the outer circumferential surface of the exterior main body 10, the first fiber-reinforced resin sheets 13 are prevented by the third fiber-reinforced resin sheets 18 from being peeled or damaged when the end surface constituted by the layers of the first fiber-reinforced resin sheets 13 of the exterior main body 10 is subjected to an impact. As a result of this structure, the outer circumferential surface of the exterior main body 10 can be easily and favorably protected.

Moreover, in the exterior member 6 of this wristwatch case 1, the projection sections 12 and the band attachment sections 2 which are projections are provided on the outer circumferential surface of the exterior main body 10, and the protective layers 17 are provided on the surfaces of the projection sections 12 and the band attachment sections 2. Accordingly, even though the surfaces of the projection sections 12 and the band attachment sections 2 projecting on the outer circumferential surface of the exterior main body 10 are likely to be subjected to external impacts, the first fiber-reinforced resin sheets 13 in the surfaces of the projection sections 12 and the band attachment sections 2 can be prevented by the protective layers 17 formed of the third fiber-reinforced resin sheets 18 from being peeled or damaged. As a result of this structure, the surfaces of the projection sections 12 and the band attachment sections 2 can be easily and favorably protected.

Furthermore, in the exterior member 6 of this wristwatch case 1, since the third fiber-reinforced resin sheets 18 are provided only on the surfaces of the projection sections 12 and the band attachment sections 2 projecting on the outer circumferential surface of the exterior main body 10, the outer circumferential surface of the exterior main body 10 excluding the projection sections 12 and the band attachment sections 2 is formed by the end surface constituted by the layers of the first fiber-reinforced resin sheets 13, and these layers of the end surface show a horizontal striped pattern. This horizontal striped pattern formed by the layers of the first fiber-reinforced resin sheets 13 enhances the design, whereby the wristwatch whose commodity value is high can be acquired.

Still further, in the exterior member 6 of this wristwatch case 1, the fibers of each third fiber-reinforced resin sheet 18 have been arrayed in two directions intersecting with the laminating direction of the first fiber-reinforced resin sheets 13 of the exterior main body 10 such that these carbon fibers cross one another. As a result, the strength of each third fiber-reinforced resin sheet 18, in which fibers have been arrayed in two directions intersecting with the laminating direction of the first fiber-reinforced resin sheets 13 of the exterior main body 10 such that these carbon fibers cross each other, is higher than that of a sheet in which fibers have been arrayed in one direction intersecting with the laminating direction of the first fiber-reinforced resin sheets 13 of the exterior main body 10. As a result of this structure, even when the end surface constituted by the layers of the first fiber-reinforced resin sheets 13 of the exterior main body 10 is subjected to an impact, the first fiber-reinforced resin sheets 13 can be more reliably prevented from being peeled or damaged.

That is, in the exterior member 6 of this wristwatch case 1, the fibers of each third fiber-reinforced resin sheet 18 have been arrayed in two directions so that these fibers cross one another in a mesh pattern. By these third fiber-reinforced resin sheets 18 where fibers have been arrayed in a mesh pattern, the rigidity and strength of the protective sheets 17 can be reliably enhanced. As a result of this structure, even when the end surface constituted by the layers of the first fiber-reinforced resin sheets 13 of the exterior main body 10 is subjected to an impact, the first fiber-reinforced resin sheets 13 can be more reliably prevented by the protective layers 17 formed of the third fiber-reinforced resin sheets 18 from being peeled or damaged.

In addition, in the case of the exterior member 6 of this wristwatch case 1, the third fiber-reinforced resin sheets 18 are carbon fiber-reinforced resin sheets. By this structure as well, the rigidity and strength of the protective layers 17 formed of the third fiber-reinforced resin sheets 18 are enhanced. Accordingly, even when the end surface constituted by the layers of the first fiber-reinforced resin sheets 13 of the exterior main body 10 is subjected to an impact, the first fiber-reinforced resin sheets 13 can be reliably and favorably prevented by the protective layers 17 formed of the third fiber-reinforced resin sheets 18 from being peeled or damaged.

Also, in the case of the exterior member 6 of this wristwatch case 1, the protective layers 17 formed of the third fiber-reinforced resin sheets 18 are welded to the surfaces of the projection sections 12 and the band attachment sections 2 which are projections. As a result of this structure, the third fiber-reinforced resin sheets 18 can be easily and unfailingly provided on the surfaces of the projection sections 12 and the band attachment sections 2.

That is, in the case of the exterior member 6 of this wristwatch case 1, the first fiber-reinforced resin sheets 13 and the third fiber-reinforced resin sheets 18 are sheets acquired by fibers being solidified by synthetic resin. When being adhered to one another, the third fiber-reinforced resin sheets 18 and the first fiber-reinforced resin sheets 13 are welded to and firmly adhered to one another by thermo-compression bonding. As a result of this structure, the third fiber-reinforced resin sheets 18 can be firmly adhered to the surfaces of the projection sections 12 and the band attachment sections 2 easily and unfailingly so as to be fixed thereon.

In the above-described embodiment, the third fiber-reinforced resin sheets 18 are provided on the surfaces of the projection sections 12 and the band attachment sections 2 projecting from the outer circumferential surface of the exterior main body 10. However, the present invention is not limited thereto, and a structure may be adopted in which the third fiber-reinforced resin sheets 18 are provided on the entire outer circumferential surface of the exterior main body 10.

In that structure, since the third fiber-reinforced resin sheets 18 are provided on the entire outer circumferential surface of the exterior main body 10, the first fiber-reinforced resin sheets 13 are prevented by the third fiber-reinforced resin sheets 18 which are the protective layers 17 from being peeled or damaged when the end surface constituted by the layers of the first fiber-reinforced resin sheets 13 of the exterior main body 10 is subjected to an impact. As a result of this structure, the outer circumferential surface of the exterior main body 10 is reliably and favorably protected.

Also, in the above-described embodiment, each protective layer 17 has the structure where the fibers of the third fiber-reinforced resin sheet 18 have been arrayed in two directions intersecting with the laminating direction of the first fiber-reinforced resin sheets 13 of the exterior main body 10 so as to be in a mesh pattern. However, the present invention is not limited thereto, and each protective layer 17 may have a structure in which the fibers of the third fiber-reinforced resin sheet 18 have been arrayed in one direction intersecting with the laminating direction of the first fiber-reinforced resin sheets 13 of the exterior main body 10. By this structure as well, the first fiber-reinforced resin sheets 13 can be prevented from being peeled or damaged when the end surface constituted by the layers of the first fiber-reinforced resin sheets 13 of the exterior main body 10 is subjected to an impact.

Moreover, in the above-described embodiment, each reinforcement section 15 is formed in a cylindrical shape where the second fiber-reinforced resin sheets 14 have been concentrically rolled. However, the present invention is not limited thereto. For example, a structure may be adopted in which each reinforcement section 15 is formed in an elliptical shape where the second fiber-reinforced resin sheets 14 have been elliptically rolled. Also, a structure may be adopted in which each reinforcement section 15 is formed in a polygonal cylinder shape where the second fiber-reinforced resin sheets 14 have been polygonally rolled, or more specifically, triangularly, squarely, or polygonally rolled.

By the above-described structures being adopted, the second fiber-reinforced resin sheets 14 are concentrically rolled to be a multilayer such that each reinforcement section 15 is formed in an elliptical shape or a polygonal cylinder shape. That is, each reinforcement section 15 can be formed in a desired shape suitable for an intended use and, even when each reinforcement section 15 formed of the second fiber-reinforced resin sheets 14 is in this desired shape, high rigidity and high strength can be acquired for these reinforcement sections 15 formed of the second fiber-reinforced resin sheets 14.

Also, in the above-described embodiment, the upper case 5 is made of a metal such as stainless steel or a hard synthetic resin. However, the present invention is not limited thereto. For example, a structure may be adopted in which the upper case 5 has the structure where the first fiber-reinforced resin sheets 13 have been laminated, as with the exterior member 6. Moreover, in the above-described embodiment, the first fiber-reinforced resin sheets 13 are the first fiber resin sheets of the present invention, and the third fiber-reinforced resin sheets 18 are the second fiber resin sheets of the present invention. However, the first fiber resin sheets and second fiber resin sheets of the present invention are not limited thereto. That is, the first fiber-reinforced resin sheets 13 and the third fiber-reinforced resin sheets 18 may be simple fiber resin sheets, or in other words, fiber resin sheets having fibers mainly made for a use purpose other than strength improvement. Note that this also applies to the second fiber-reinforced resin sheets 14 which form the reinforcement sections 15.

Moreover, in the above-described embodiment, the present invention has been applied in a wristwatch. However, the present invention is not necessarily required to be applied in a wristwatch. For example, the present invention is applicable to various types of timepieces such as a travel watch, an alarm clock, a table clock, and a wall clock. Furthermore, the present invention is not necessarily required to be applied in timepieces, and can be applied in electronic devices such as a portable telephone and a portable terminal device.

While the present invention has been described with reference to the preferred embodiments, it is intended that the invention be not limited by any of the details of the description therein but includes all the embodiments which fall within the scope of the appended claims.

What is claimed is:

1. A timepiece comprising:
    an exterior member comprising:
        an exterior main body having laminated first fiber resin sheets, and
        a protection member provided on an end surface constituted by layers of the first fiber resin sheets of the exterior main body; and
    an upper case attached to an upper part of the exterior member,
    wherein the upper case has the laminated first fiber resin sheets.

2. The timepiece according to claim 1, wherein the protection member is a second fiber resin sheet having fibers arrayed in a direction intersecting with a laminating direction of the first fiber resin sheets.

3. The timepiece according to claim 1, wherein a projection is provided on an outer circumferential surface of the exterior main body, and the protection member is provided on a surface of the projection.

4. The timepiece according to claim 3, wherein the projection includes a projection portion and an attachment projection portion which project from the outer circumferential surface of the exterior main body.

5. The timepiece according to claim 2, wherein the fibers are arrayed in one direction in the second fiber resin sheet.

6. The timepiece according to claim 2, wherein the fibers are arrayed in two directions while crossing one another in the second fiber resin sheet.

7. The timepiece according to claim 1, wherein the protection member is a carbon fiber resin sheet which is a fiber-reinforced resin sheet.

8. The timepiece according to claim 1, wherein the protection member is welded to a surface of a projection provided on an outer circumferential surface of the exterior main body.

9. The timepiece according to claim 1, wherein each first fiber resin sheet is a fiber-reinforced resin sheet having arrayed glass fibers, and the laminated first fiber resin sheets are colored for each layer.

10. The timepiece according to claim 1, wherein the exterior main body has the first fiber resin sheets laminated thereon, each of which is a combination of a sheet having arrayed carbon fibers and a sheet having arrayed glass fibers.

* * * * *